Nov. 29, 1960 F. O. LUENBERGER 2,962,128
MECHANISM FOR PREVENTING REVERSE MOTION
OF ELECTRIC MOTOR SHAFTS
Filed Nov. 26, 1957 2 Sheets-Sheet 1

FREDERICK O. LUENBERGER
INVENTOR.

BY Ham and Ham
ATTORNEYS.

Nov. 29, 1960  F. O. LUENBERGER  2,962,128
MECHANISM FOR PREVENTING REVERSE MOTION
OF ELECTRIC MOTOR SHAFTS
Filed Nov. 26, 1957  2 Sheets-Sheet 2

FREDERICK O. LUENBERGER
INVENTOR.

BY Flam and Flam
ATTORNEYS.

United States Patent Office 2,962,128
Patented Nov. 29, 1960

2,962,128

MECHANISM FOR PREVENTING REVERSE MOTION OF ELECTRIC MOTOR SHAFTS

Frederick O. Luenberger, Los Angeles, Calif., assignor to U.S. Electrical Motors, Inc., Los Angeles, Calif., a corporation of California Filed Nov. 26, 1957, Ser. No. 699,079

1 Claim. (Cl. 188—82.84)

This invention relates to a mechanism that restrains a shaft against angular motion in a direction reverse to that normally intended for the shaft.

Such mechanisms in general are now in use in vertical electric motors intended to operate underground pumps in wells. The underground pumps utilize runners carried by the motor shaft.

Upon circuit failure, the torque developed by the motor consequently fails. Under such circumstances, a reverse torque may develop upon the runners, urging the motor shaft in a reverse direction. If this reverse rotation be permitted, injury to the motor may result. Accordingly, it is advantageous to utilize a mechanism that restrains the motor from such reverse rotation.

It is one of the objects of this invention to provide a simple and effective restraint of this character.

It is another object of this invention to provide a restraint in which the restraining structure occupies little space.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of the invention is best defined by the appended claim.

Referring to the drawings.

Figure 1:
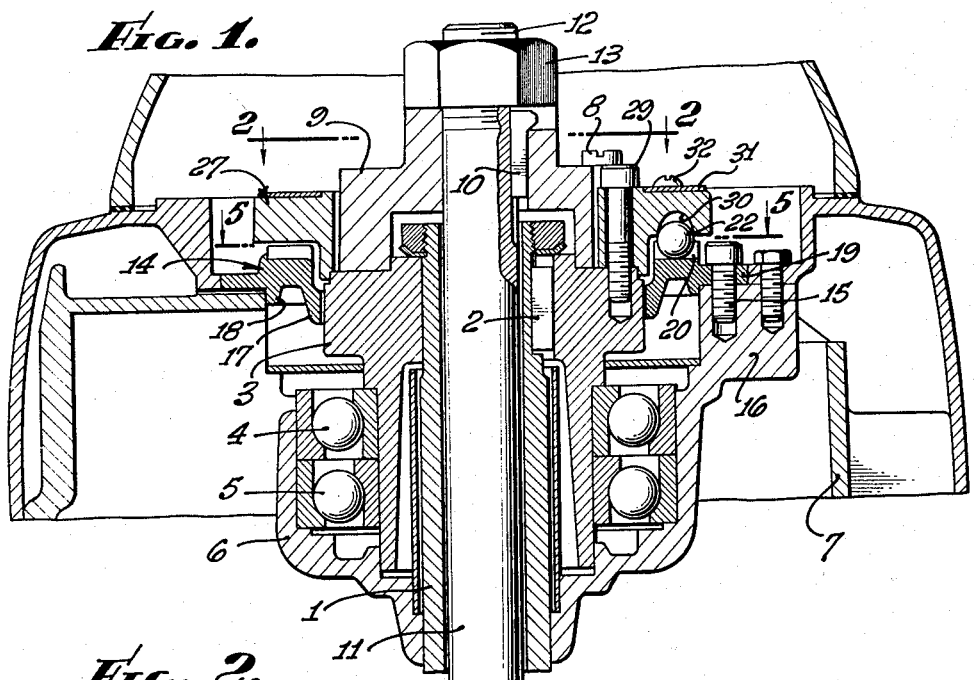
Figure 1 is a fragmentary vertical section of the upper part of a vertical electric motor incorporating the invention.

In the present instance, the invention is shown as applied to a hollow shaft electric motor. The electric motor has a rotor (not shown) carried by the outer or hollow shaft 1. This hollow shaft 1 is joined as by a key 2 to a lower coupling member 3. This lower coupling member is supported by a bearing structure including the thrust ball bearings 4 and 5 supported in a bracket structure 6. This bracket structure 6 is formed as a part of an upper main bracket member 7.

The lower coupling member 3 is joined as by the aid of the screws 8 to the upper coupling member 9. The upper coupling member in turn is keyed as by a key 10 to the inner shaft 11. This inner shaft 11 has an upper end 12 which is threaded to receive an adjusting nut 13.

Since this type of mechanism is now quite well known in vertical electric motors located at the top of a well, further detailed description thereof is deemed unnecessary.

The rotary structure, including shafts 1 and 11, and coupling members 3 and 9, is restrained against rotation in the reverse direction by the aid of mechanism now to be described.

For this purpose, use is made of a stationary annular member 14 supported as by the aid of a plurality of screws 15 upon a flange 16 formed integrally with the bracket structure 6—7. As shown most clearly in Fig. 5, the heads of these screws may have recesses therein for the accommodation of an Allen headless screw wrench.

The non-rotary member 14 has a downwardly directed flange 17 which closely surrounds the outer periphery of the lower coupling member 3. It is also provided with a shorter downwardly directed flange 18 telescoping within the flange 16. Another flange 19 through which the screws 15 pass extends radially outwardly of the structure.

In the present instance, the non-rotary member 14 has a plurality of equiangularly spaced slanting recesses or pockets 20. These recesses or pockets are shown to best advantage in Figs. 7 and 8. At the deep end of the recesses a curved wall 21 is provided, corresponding in curvature to the spherical surfaces of balls 22. How these balls are supported will be explained hereinafter.

Adjacent recesses 20 are so spaced that the shallow end of one is adjacent the deep end of the next one. Thus the recesses 20 are arranged end-to-end in a circular pattern. A flat surface 23 is disposed between adjacent recesses. The end edges or corners 24 and 25 of the recesses form straight lines parallel to equiangularly spaced radial lines 26. In the present instance, there are twelve recesses 20.

Figure 2:
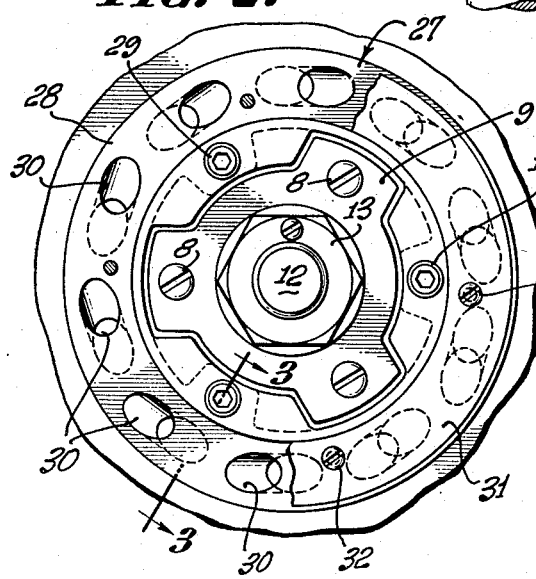
Fig. 2 is a sectional view, taken along a plane corresponding to line 2—2 of Fig. 1.
Figure 3:
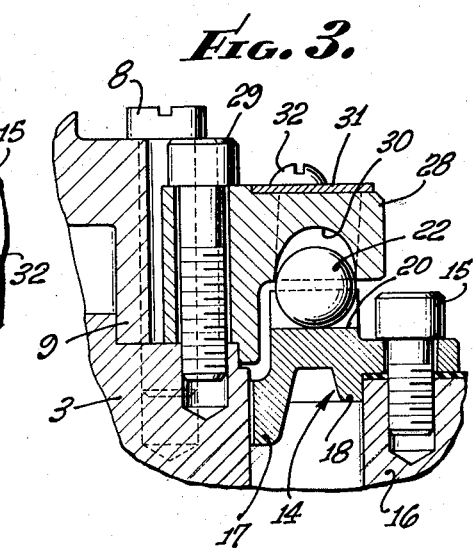
Fig. 3 is an enlarged sectional view, taken along a plane corresponding to line 3—3 of Fig. 2.
Figure 4:
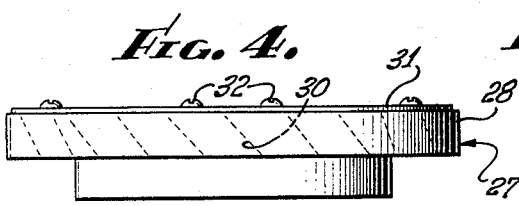
Fig. 4 is a side elevation of the rotating portion of the mechanism for restraining a shaft against reverse rotation.

The annular rotary member 27 is shown to best advantage in Figs. 3 and 4. This rotary member overlies the member 14. It is attached to the lower coupling member 3 as by the aid of machine screws 29. A flange 28 extends radially outwardly. Therein there is a series of slanting cylindrical apertures 30. These are shown to best advantage in Fig. 2. The number of slanting apertures 30 differ slightly from the number of slanting recesses 20. Thus, for example, there are ten of the recesses 30. In each of the recesses there is located a ball 22. In order to restrain the balls 22 from moving out of the apertures 30, use is made of an annular cover plate 31 which is fastened to the top of the flange 28 as by the aid of screws 32. A part of this annular plate 31 is broken away in Fig. 2.

The axes 33 (Fig. 8) of the slanting apertures 30 are substantially normal to the bottom surfaces of the recesses 20.

Figure 5:
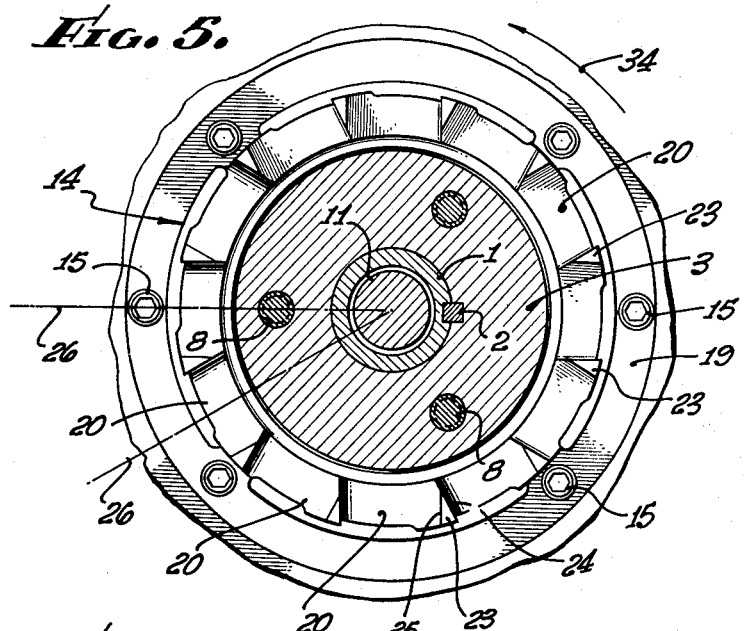
Fig. 5 is a sectional view taken along a plane corresponding to line 5—5 of Fig. 1.
Figure 6:
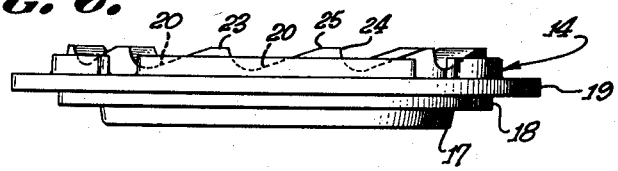
Fig. 6 is a side elevation of the stationary part of the mechanism for preventing reverse rotation.
Figure 8:
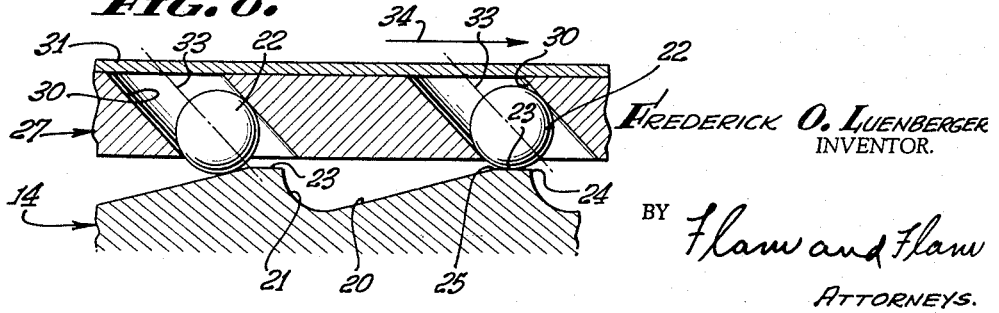

If we assume that the shaft 11 is rotating in the direction indicated by arrow 34 of Figs. 5 and 8; that is, in a counterclockwise direction, then the balls 22 simply ride upwardly on the bottom surfaces of the recesses 20 without any restraint against rotation.

Figure 7:
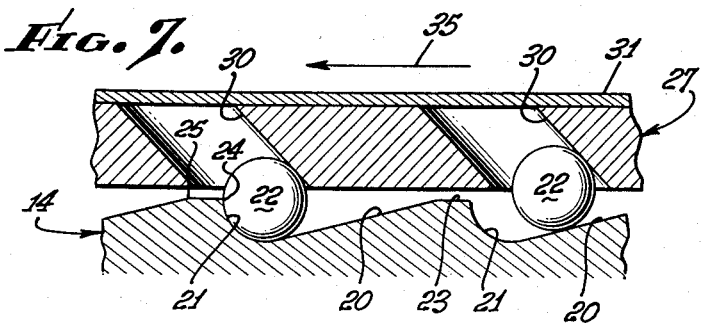
Figs. 7 and 8 are fragmentary diagrammatic views illustrating the manner of operation of the mechanism for restraining a shaft against reverse rotation.

However, if the rotation is reversed as indicated by arrow 35 in Fig. 7 for any reason, then the balls 22 will become wedged between the apertures 30 and the surfaces 21. Only a small angular reverse rotation is permitted before the wedging action takes place. Thus, for any relative angular position of the two members 14 and 27, the balls 22 are at different positions along the bottom of recesses 20. This is true because the number of balls 22 differs from the number of recesses. That ball 22 which is closest to a wall 21 is the one that serves to prevent reverse rotation, the other balls 22 not yet having reached this point.

Due to the arrangement in which the flange 28 overlaps and overlies the member 14, the radial extent of the mechanism is maintained within relatively small limits.

The inventor claims:

In a structure having a vertical rotary shaft: a non-rotary annular member surrounding the shaft and having an upper plane horizontal surface, as well as a series of equiangularly spaced pockets opening in said upper surface and arranged end to end, the bottom of each pocket sloping so that the shallow end of each pocket is adjacent the deep end of an adjacent pocket; the pockets being arranged to form an annular series about the axis of the shaft; the ends of adjacent pockets being closely spaced; a rotary member carried by the shaft and having a lower horizontal surface closely spaced from the said upper horizontal surface; said rotary member having a series of cylindrical guiding apertures, forming an annular arrangement overlying the said pockets; the apertures being inclined and such that the upper ends of the apertures are substantially as close to the axis of the shaft as the lower open end of the apertures; the inclination being substantially normal to the sloping surface of a pocket when the aperture passes over the pocket; a cover for the upper ends of the apertures; said cover being detachably secured to the upper surface of the rotary member; and a ball in each aperture and of such size as to be guided thereby.

References Cited in the file of this patent

UNITED STATES PATENTS

| | | |
|---|---|---|
| 1,270,570 | Van Ness | June 25, 1918 |
| 1,337,634 | Benson | Apr. 20, 1920 |
| 1,499,923 | Hall | July 1, 1924 |
| 2,824,625 | Rice | Feb. 25, 1958 |